United States Patent [19]

Abe et al.

[11] 4,142,375
[45] Mar. 6, 1979

[54] CONTROL APPARATUS FOR AIR CONDITIONING UNIT

[75] Inventors: Yuuhei Abe, Fujisawa; Katsuo Mohri, Yokosuka; Nobuo Azuma; Kazuyoski Kuwahara, both of Yokohama; Yuhiko Yabe, Tochigi; Yasunori Tominaga, Ohiramachi, all of Japan

[73] Assignee: Hitachi, Ltd., Japan

[21] Appl. No.: 855,326

[22] Filed: Nov. 28, 1977

[30] Foreign Application Priority Data

Nov. 29, 1976 [JP] Japan ................ 51-142294

[51] Int. Cl.² .................................. F25B 19/00
[52] U.S. Cl. ........................ 62/158; 62/231; 361/22
[58] Field of Search ............. 62/158, 231, 229; 361/22; 318/471

[56] References Cited

U.S. PATENT DOCUMENTS

| | | | |
|---|---|---|---|
| 2,145,909 | 2/1939 | Zwickl | 62/229 X |
| 3,054,271 | 9/1962 | McGrath et al. | 62/158 X |
| 3,422,633 | 1/1969 | Bodett | 62/158 |
| 3,434,028 | 3/1969 | McCready | 62/158 |
| 3,573,486 | 4/1971 | Harris | 62/158 X |
| 3,573,486 | 4/1971 | Harris | 62/231 X |
| 3,583,173 | 6/1971 | Chesebro | 62/158 |
| 3,619,722 | 11/1971 | Gill et al. | 361/22 X |
| 3,620,037 | 11/1971 | Young | 62/158 |
| 3,640,085 | 2/1972 | Harris | 62/158 |
| 3,673,811 | 7/1972 | Adams et al. | 62/158 |
| 3,721,880 | 3/1973 | Neill | 62/158 X |
| 3,745,781 | 7/1973 | Rasmussen | 62/158 |
| 3,796,061 | 3/1974 | Weihl | 361/22 X |
| 3,796,892 | 3/1974 | Stewart | 361/22 X |
| 3,817,052 | 6/1974 | Connelly et al. | 62/231 X |
| 3,864,611 | 2/1975 | Chang | 361/22 X |

*Primary Examiner*—Leslie Braun
*Attorney, Agent, or Firm*—Craig & Antonelli

[57] ABSTRACT

An automatic control apparatus for protecting the compressor motor used with the refrigeration system of an air conditioning unit. The control apparatus has a timer for prohibiting the restart of the compressor motor until the lapse of a predetermined time after temporary stoppage of the compressor motor, and a holding circuit for holding a power source voltage for a predetermined period of time while the operation of the air conditioning unit is stopped. Even if the power supply is turned off, therefore, the source voltage supplied by the holding circuit enables the timer circuit to continue its operation for a predetermined length of time.

9 Claims, 8 Drawing Figures

CONTROL APPARATUS FOR AIR CONDITIONING UNIT

LIST OF PRIOR ART REFERENCE (37 CFR 1.56(a))

The following reference is cited to show the state of the art:
U.S. Pat. No. 3,054,271

BACKGROUND OF THE INVENTION

This invention relates to an air conditioning unit or more in particular to a control apparatus including a circuit for protecting the compressor motor used with the refrigeration system of the air conditioning unit.

In conventional air conditioning units, the control apparatus includes a protecting device for protecting the compressor motor. Generally, before equalization of refrigerant pressure in the refrigeration system after stoppage of the compressor motor for some reason or other, the compressor motor with a low starting torque cannot restart over the refrigerant pressure. Unless the compressor motor restarts, an excess current flows in the compressor motor thereby to damage the same. Assume, for instance, that the indoor temperature reaches an appropriate level and the compressor motor stops. Immediately after that, when the air temperature becomes improper, the compressor motor cannot restart even if the current is made to flow in the compressor motor.

An ordinary protecting device cuts off the current in the compressor motor until the lapse of a predetermined length of time after the stoppage of the compressor motor, thus protecting the compressor motor. The length of time for which the current is required to be cut off is equal to the time required for equalization of the refrigerant pressure.

A conventional protecting device made up of mechanical parts is disclosed in detail in the U.S. Pat. No. 3,054,271 entitled "Automatic Controls for Air Conditioning Unit".

An electrical protecting device includes an electronic timer for determining the time required for cutting off the current flowing in the compressor motor. When the power supply is cut off, this electronic timer generally loses its functions as a timer, while at the same time disabling the functions of the protecting device. When the source current is thrown off temporarily and resupplied, therefore, the compressor motor is locked so that an excess current flows in the compressor motor.

Another type of protecting device has a function to cut off the current in the compressor motor when the power switch is closed after the stoppage of the compressor motor. This type of protecting device is such that the compressor motor is protected even in the case where the source current is cut off temporarily and resupplied. In the air conditioning unit having this type of protecting device, however, the compressor motor is not actuated until the lapse of a predetermined length of time after supply of the source current even if the refrigerant pressure is equalized, thus deteriorating the high response required of the air conditioning unit.

SUMMARY OF THE INVENTION

An object of the present invention is to provide an improved control apparatus for the air conditioning unit.

Another object of the present invention is to provide a control apparatus having an improved protecting device suitable for protection of the compressor motor used with the refrigeration system of the air conditioning unit.

A further object of the present invention is to provide a control apparatus including a protecting device which immediately enables start or restart of the compressor motor in the case where the refrigerant pressure is equalized.

The control apparatus according to the present invention comprises a main control circuit, a temperature detector circuit and a timer circuit. In response to a voltage generated by a manual switch for starting and stopping the operation of the air conditioning unit, the main control circuit generates a signal for permitting the operation of the compressor motor for starting the operation, and a signal for stopping the compressor motor for stopping the operation. In response to a signal for stopping the operation of the compressor motor, the timer circuit generates a signal for prohibiting the restart of the compressor motor for a predetermined length of time and a signal for holding the source current for a predetermined length of time. The timer circuit, in response to the temperature of indoor air, generates a signal for prohibiting the start and restart of the compressor motor in the case where the indoor air temperature is within a predetermined range, and a signal for permitting the start and restart of the compressor motor in the case where the indoor air temperature is outside of the predetermined range.

If the indoor air temperature is outside of the predetermined range in the case where the source current is supplied, therefore, the compressor motor immediately starts. When the indoor air temperature enters the predetermined range, on the other hand, the compressor motor stops. Before the lapse of a predetermined length of time after the stoppage of the compressor motor, the compressor motor is prevented by the output of the timer circuit from being restarted for a predetermined length of time. Since the source current is maintained for a predetermined length of time when the air conditioning unit stops its operation, the timer circuit continues to function, thereby maintaining the functions of the protecting device in the meantime.

Incidentally, the compressor motor operates for cooling and heating the room when the indoor air temperature is higher and lower than a predetermined range respectively.

DETAILED DESCRIPTION OF THE PREFERRED EMBODIMENTS

Figure 1:
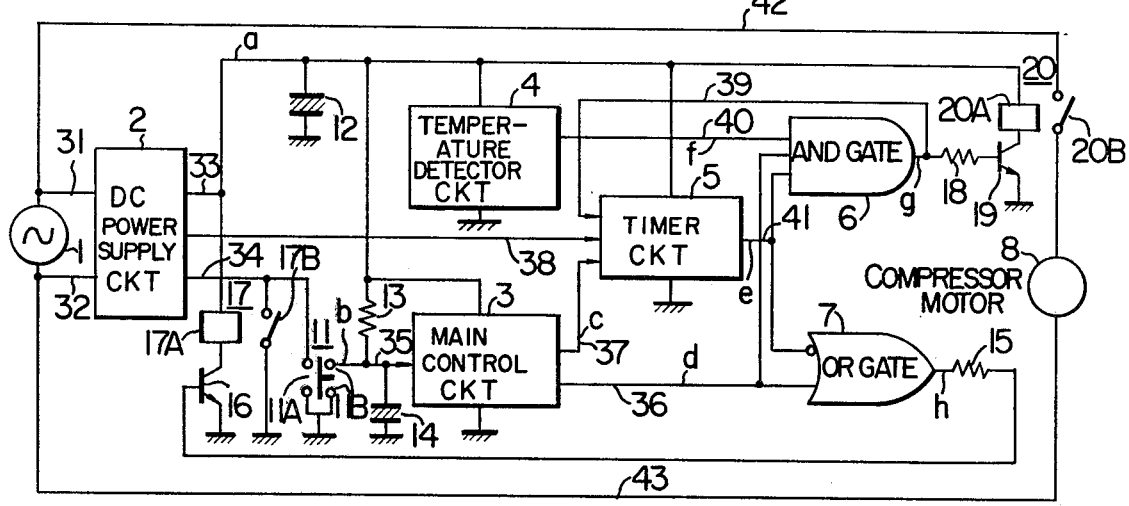
FIG. 1 is a circuit diagram showing in blocks an embodiment of the control apparatus according to the present invention.

The present invention will be described with reference to the accompanying drawings. In FIG. 1, an AC current is supplied to a DC power supply circuit 2 through lines 31 and 32 from an appropriate AC power supply 1, and is rectified into DC current by the DC power supply circuit 2. At time point $t_0$ when the contact 11A of the manual switch 11 is closed, a transient current flows through the line 33, a capacitor 12, the ground, the contact 11A and a line 34, thereby charging the capacitor 12, with the result that a DC voltage is generated in the line 33. The voltage waveform generated in line 33 is shown in (a) of FIG. 2. This DC voltage Ea is applied to the main control circuit 3, the temperature detector circuit 4, the timer circuit 5, the AND gate 6, the OR gate 7, and the transistors 16 and 19. Further, this voltage Ea is supplied to the input terminal of the main control circuit 3 through the resistor 13, the capacitor 14 and the line 35. The resistor 13 and the capacitor 14 make up an integrator circuit so that the rise of the voltage in the line 35 is delayed. The voltage waveform of line 35 assumes the form as shown in (b) of FIG. 2. The manual switch 11 is of non-lock type and is automatically connected to the contact 11B at time point $t_4$ in FIG. 2 after operation. After the closing of the contact 11B and opening of the contact 11A, currents flowing in each circuit are supplied from the capacitor 12. The compressor motor 8 is connected to the AC power supply 1 through the contact 20B of the relay 20 and the lines 42 and 43. The contact 20B of the relay 20 is closed when current flows in the relay coil 20A. One terminal of the relay coil 20A is connected through the line 33 to the DC power supply circuit 2, and the other terminal thereof to the collector of the transistor 19. The base of the transistor 19 is connected through the resistor 18 to the output terminal of the AND gate 6. The emitter of the transistor 19 is grounded. Accordingly, when current flows in the base of the transistor 19 through the resistor 18 from the AND gate 6, the compressor motor 8 is started. The AND gate 6 is supplied with the output signals from the main control circuit 3, the timer circuit 5 and the temperature detector circuit 4 so that in the case where a signal of level H is supplied to the AND gate 6, the AND gate 6 supplies the base current to the transistor 19.

The OR gate 7 is supplied with the output signals of the main control circuit 3 and the timer circuit 5. In the case where the OR gate 7 receives a signal of level H from the main control circuit 3 or a signal of level L from the timer circuit 5, the OR gate 7 supplies the base current to the transistor 16. The contact 17B of the relay 17 is an auxiliary switch connected in parallel to the contact 11A of the manual switch 11 and closed when current flows in the relay coil 17A. One of the terminals of the relay coil 17A is connected to line 33, and the other terminal thereof to the collector of the transistor 16. The emitter of the transistor 16 is grounded and the base thereof connected to the output terminal of the OR gate 7 through the resistor 15. When the base current is supplied to the transistor 16 from the OR gate 7, therefore, the auxiliary switch, i.e., the contact 17B is closed. As a result, even in the case where the contact 11A of the manual switch 11 is not closed, DC current is again supplied to each circuit from the DC power supply circuit 2.

Figure 2:
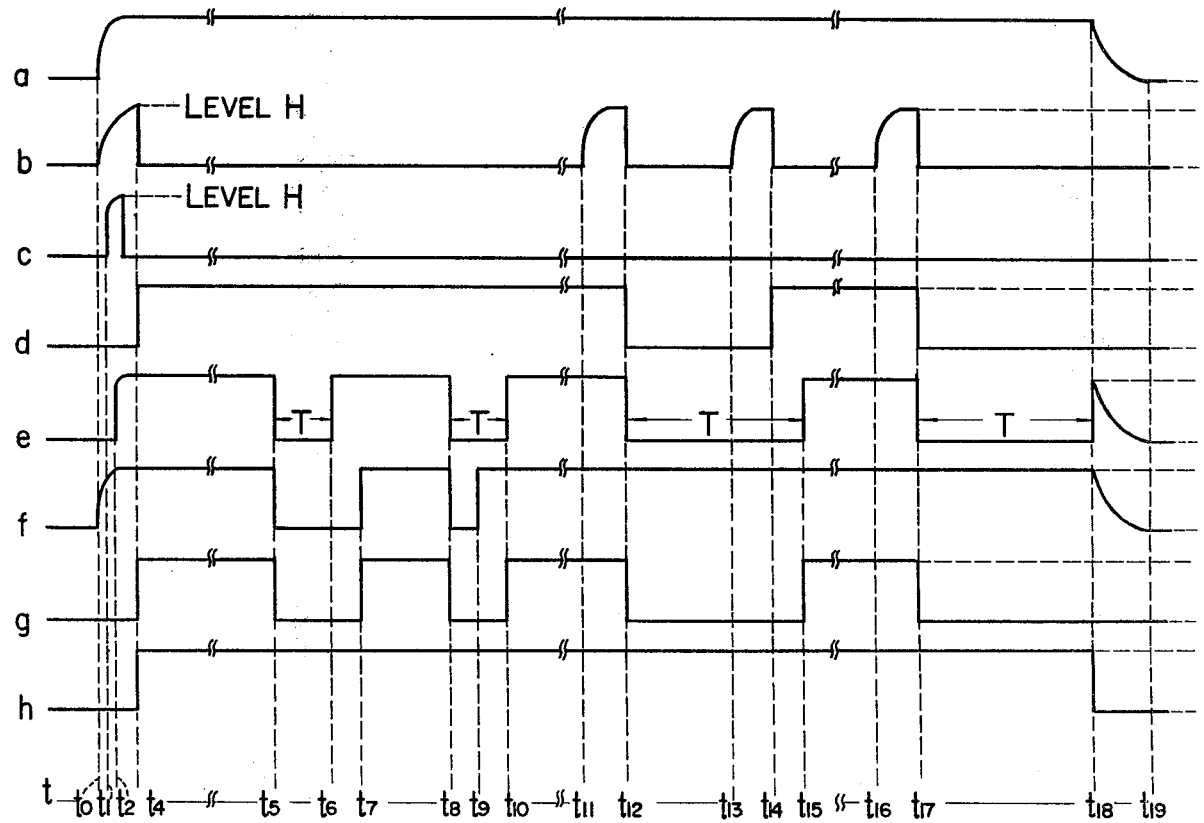
FIG. 2 is a diagram showing voltage waveforms at various parts of the circuit of FIG. 1.

The main control circuit 3 generates an initial pulse with the waveform (c) in FIG. 2 in the line 37 at time point $t_1$, taking advantage of the difference between the rises of the pulse (a) of FIG. 2 in the line 33 and pulse (b) of FIG. 2 in the line 35. This initial pulse is supplied to the timer circuit 5 through the line 37 thereby to determine the initial condition of the timer circuit 5. Further, the main control circuit 3, in response to the negative-going edge of the voltage in line 35 at time point $t_4$, generates in line 36 the main control signal pulse (d) of FIG. 2. The main control signal (d) is applied through line 36 to the AND gate 6 and OR gate 7. After time point $t_4$, therefore, the base current is supplied from the OR gate 7 to the transistor 16, so that the auxiliary switch 17B is closed and DC current is supplied to each circuit. The voltage waveform of the output signal of the OR gate 7 is shown in (h) of FIG. 2. The timer circuit 5, whose initial condition is set by the initial pulse (c) in FIG. 2, generates a signal of level H in line 41 at time point $t_1 + \Delta t_1$, and supplies its output signal to the AND gate 6 and OR gate 7. The voltage waveform produced in line 41 is shown in (e) of FIG. 2. In addition to the initial pulse (c) of FIG. 2, clock pulses (shown in (r) of FIG. 6) and the output signal of the AND gate 6 are applied to the timer circuit 5. The clock pulses are the result of shaping the voltage waveform of the AC power supply 1 by the DC power supply circuit 2. For example, the voltage of the AC power supply 1 is fullwave rectified and applied through the line 38 to the timer circuit 5. The timer circuit 5 is controlled after time point $t_4$ by the output signal of the AND gate 6 which is applied to the timer circuit 5 through line 39. The output signal of the timer circuit 5 assumes level L when the output signal of the AND gate 6 reaches level L. And after a predetermined length of time T, the output signal of the timer circuit 5 reaches level H again. When the indoor air temperature is displaced out of the predetermined range, the temperature detector circuit 4 produces a signal of level H in line 40 and applies this signal to the AND gate 6. This signal reaches level L when the indoor air temperature reaches a level included in the predetermined temperature range. The voltage waveform in line 40 is shown in (f) of FIG. 2. The AND gate 6 produces a signal of level H when all the signals produced by the main control circuit 3, timer circuit 5 and temperature detector circuit 4 are at level H, so that base current is supplied to the transistor 19 through resistor 18. The voltage waveform of the output signal of the AND gate 6 is shown in (g) of FIG. 2. Assuming that the output signals (d), (e) and (f) of FIG. 2 produced from the main control circuit 3, the temperature detector circuit 4 and the timer circuit 5 reach level H at time point $t_4$, the output signal of the AND gate 6 which is shown in (g) of FIG. 2 also assumes level H, with the result that current flows in the transistor 19, thereby starting the compressor motor 8. At time point $t_5$ when the indoor air temperature reaches a level included in the predetermined range, the output signal (f) of FIG. 2 produced from the temperature detector circuit 4 reaches level L and the output signal (g) of FIG. 2 produced from the AND gate 6 also assumes level L. The output signal of the AND gate 6 is applied through line 39 to the timer circuit 5 and therefore the output signal (e) of FIG. 2 produced from the timer circuit 5 also assumes level L at time point $t_5$.

After the lapse of a predetermined length of time, the output signal of the timer circuit 5 is restored to level H at time point $t_6$. At time point $t_7$, the indoor air temperature goes out of the predetermined temperature range and the output signal (f) of FIG. 2 produced from the temperature detector circuit 4 reaches level H again. At the same time, the output signal of AND gate 6 also assumes level H. At time point $t_8$ when the output signal (f) of FIG. 2 produced from the temperature detector circuit 4 again assumes level L, the output signals (g) and (e) of FIG. 2 produced from the AND gate 6 and the timer circuit 5 respectively assume level L. When the indoor air temperature is displaced from the predetermined temperature range again at time point $t_9$, the output signal of the temperature detector circuit 4 reaches level H. At time point $t_9$, however, the predetermined length of time T has not yet passed from the stoppage of the compressor motor 8 and the output signal of the timer circuit 5 is not yet restored to level H, so that the output signal of the AND gate 6 is maintained at level H, which output signal reaches level H at time point $t_{10}$ and thereafter upon the lapse of the predetermined time T. The normal operation of the air conditioning unit is performed by repetition or a succession of the operating steps from time point $t_5$ to $t_{10}$.

When the contact 11B of the manual switch 11 is opened at time point $t_{11}$ in order to stop the operation of the air conditioning unit, the voltage (b) of FIG. 2 produced in line 35 increases toward level H and, at time point $t_{12}$ when the contact 11B is closed, is reduced again to level L. The output signal (d) of FIG. 2 produced from the main control circuit 3 becomes level L by being triggered by the negative-going edge of the voltage in line 35 at time point $t_{12}$. Since this signal is applied through line 36 to the AND gate 6, the output signal (g) of FIG. 2 produced from the AND gate 6 also assumes level L at time point $t_{12}$. Further, the output signal (e) of FIG. 2 produced from the timer circuit 5 also takes the level L. At this time, the output signal (h) of FIG. 2 produced from the OR gate 7 is held at level H by the output signal of the timer circuit 5. In the event that before the lapse of the predetermined time T, the contact 11B of the manual switch 11 is opened for some reason or other at time point $t_{13}$ and closed at time point $t_{14}$, the negative-going edge of the voltage signal (b) of FIG. 2 in the line 35 at time point $t_{14}$ causes the output signal (d) of FIG. 2 of the main control circuit 3 to reach level H again. At this time, the compressor motor is not started since no current flows in the transistor 19. After the lapse of time T, the output signal of the timer circuit 5 is restored to level H. At the same time, the output signal of the AND gate 6 reaches level H. As a result, the compressor motor 8 starts at time point $t_{15}$. Generally, from the time point $t_{15}$, the operations performed from $t_5$ to $t_{10}$ are repeated or performed in succession.

At time point $t_{16}$, the contact 11B of the manual switch 11 is again opened. At time point $t_{17}$, it is closed, so that the output signal (d) of FIG. 2 produced from the main control circuit 3 is again reduced to level L. As at time point $t_{12}$, the output signals of the AND gate 6 and the timer circuit 5 become L in level. Unless the contact 11B of the manual switch 11 is opened until the lapse of the time T from time point $t_{17}$, the output signal (e) of FIG. 2 produced from the timer circuit 5 is again restored to level H at time point $t_{18}$. Immediately after time point $t_{18}$, the main control signal (d) of FIG. 2 produced from the main control circuit 3 becomes L in level while the output signal from the timer circuit 5 reaches level H, and therefore the output signal (h) of FIG. 2 produced from the OR gate 7 is reduced to level L, so that the collector current of the transistor 16 is cut off, thereby opening the contact 17B of the auxiliary switch 17. The result is that current stops being supplied to lines 33 and 34 from the DC power supply circuit 2, so that the voltage (a) of FIG. 2 in line 33 drops until it reaches substantially 0 volt at time point $t_{19}$. If the contact 11B of the main control switch 11 is opened and the contact 11A thereof closed at or after time point $t_{19}$, the same operation as at time point $t_0$ is performed. By the way, the length of time from $t_0$ to $t_4$, from $t_5$ to $t_{10}$ and from $t_{11}$ to $t_{19}$ in FIG. 2 are shown in different scales.

Also, the signal of level H is substantially equal in level to the DC voltage in line 33, while the signal of level L is substantially equal to the ground voltage in level.

Upon the operation of the manual switch 11 at time point $t_0$ as mentioned above, the DC voltage (a) of FIG. 2 is generated. If at this time the indoor air temperature is not included in a predetermined range, the output signal (f) of FIG. 2 of the temperature detector circuit 4 reaches level H and permits the actuation of the compressor motor 8. The operation of the timer circuit 5 is stopped by the initial pulse (c) of FIG. 2 at time point $t_2$, and therefore the output signal (e) of FIG. 2 reaches level H, thereby permitting the operation of the compressor motor 8. When the main control signal (d) of FIG. 2 produced from the main control circuit 3 reaches level H and the air conditioning unit enters the operating condition at time point $t_4$, the output signal (g) of FIG. 2 produced from the AND gate 6 reaches level H, so that current flows in the relay coil 20A of the transistor 19. As a result, the contact 20B is closed thereby to start the compressor motor 8. As seen from the foregoing description, the present invention is such that when the air conditioning unit first enters the operating condition by the operation of the manual switch 11, the timer citcuit 5 fails to be actuated, while if the indoor air temperature is not included in the predetermined range, the compressor motor 8 immediately starts.

Assume that the manual switch 11 is operated in order to stop the air conditioning unit at time point $t_{11}$, that the contact 11B is automatically closed at time point $t_{12}$, that the manual switch 11 is operated again to cancel the operation of the air conditioning unit at time point $t_{13}$ and that the contact 11B is again closed at time point $t_{14}$. If the predetermined period of time T has not passed during the period from $t_{12}$ to $t_{14}$, no initial pulse is generated so that the compressor motor 8 fails to start. In other words, even if the manual switch 11 is reclosed before the passage of the predetermined time T, the compressor motor 8 fails to start. Incidentally, even if the manual switch 11 is operated to stop the operation of the air conditioning unit at time point $t_{12}$, the DC voltage (a) of FIG. 2 is maintained for the predetermined time T since the output signal (h) of FIG. 2 produced from the OR gate 7 is held at level H by the output signal (e) of FIG. 2 produced from the timer circuit 5. As a consequence, during this length of time, the timer circuit 5 keeps the functions thereof.

Figure 3:
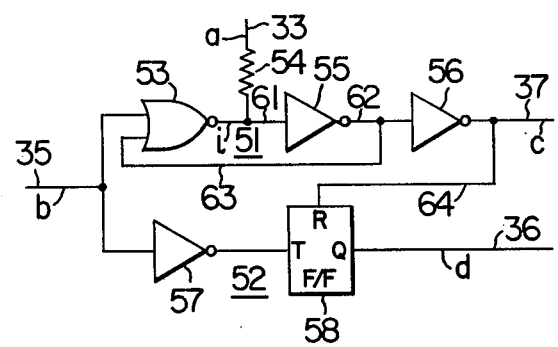
FIG. 3 is a diagram showing the main control circuit included in FIG. 1.
Figure 4:
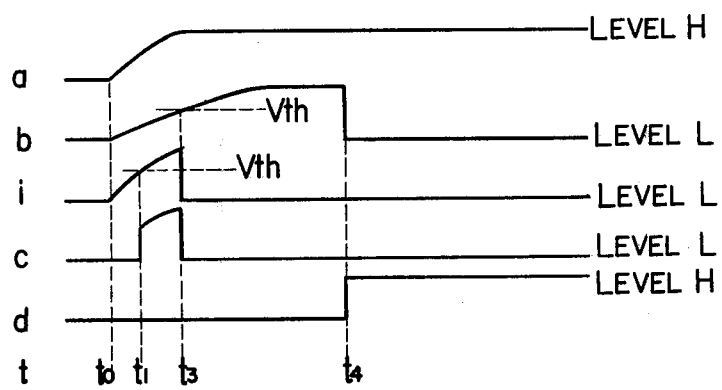
FIG. 4 is a diagram showing voltage waveforms generated at various parts of the main control circuit of FIG. 3.

Next, the main control circuit 3 will be described with reference to FIGS. 3 and 4, which respectively show a circuit diagram of the main control circuit 3 and voltage waveforms produced at various parts of the same circuit. The main control circuit 3 includes an initial pulse generator circuit 51 and a main control signal generator circuit 52. The initial pulse generator circuit 51, in turn, includes a NOR gate 53, a resistor 54, an inverter 55 and an inverter 56, while the main control signal generator circuit 52 is made up of an inverter 57 and a trigger type flip-flop (hereinafter referred to as T-F/F) 58. When the contact 11A of the manual switch 11 shown in FIG. 1 is closed at time point $t_0$, the DC voltage shown in (a) of FIG. 2 is generated in line 35 as described above while the voltage shown in (b) of FIG. 2 is produced in line 35. The waveforms of (a) and (b) of FIG. 2 are shown more in detail in (a) and (b) of FIG. 4 respectively. The line 61 of the initial pulse generator circuit 51 is connected by the resistor 54 to the line 33, so that the voltage waveform of line 61 rises in the same shape as the voltage waveform in line 33. When the voltage (i) of FIG. 4 produced in line 61 exceeds the threshold voltage Vth of the gate of the inverter 55 at time point $t_1$, the output signal of the inverter 55 is reduced to level L. This output signal is applied through line 62 to the inverter 56 and therefore the output signal of the inverter 56 is increased to level H. The voltage waveform of this output signal is shown in (c) of FIG. 4. When the voltage (b) of FIG. 4 produced in line 35 exceeds the threshold voltage Vth of the gate of the NOR gate 53 at time point $t_3$, the voltage (i) of FIG. 4 produced in line 61 connected to the output of the NOR gate 53 is reduced to level L, while the signal produced in line 62 and the output signal of the inverter 56 are increased to level H and reduced to level L respectively. In view of the fact that the output signal of the inverter 55 is connected to the input of NOR gate 53 by the line 63, the output signal of the initial pulse generator circuit 51 is held at level L regardless of the voltage level of the line 35 from time point $t_3$. This signal is a signal pulse of level H during the period from $t_1$ to $t_3$. The initial pulse (c) of FIG. 4 is applied via line 37 to the timer circuit 5 thereby to temporarily stop the timer functions. Further, the initial pulse (c) of FIG. 4 is applied to T-F/F 58 of the main control signal generator circuit 52 through line 64, thereby resetting T-F/F 58. When the contact 11B of the manual switch 11 is closed at time point $t_4$, the line 35 is connected to ground and therefore the line 35 is reduced to level L. In response to the reduction of the signal in line 35 to level L, the output signal of the inverter 57 is increased to level H, so that T-F/F 58 is triggered and the output signal of T-F/F 71 is raised to level H. The voltage waveform of the output signal of T-F/F is shown in (d) of FIG. 4. This output signal is applied through line 36 to the AND gate 6 and the OR gate 7.

Figure 5:
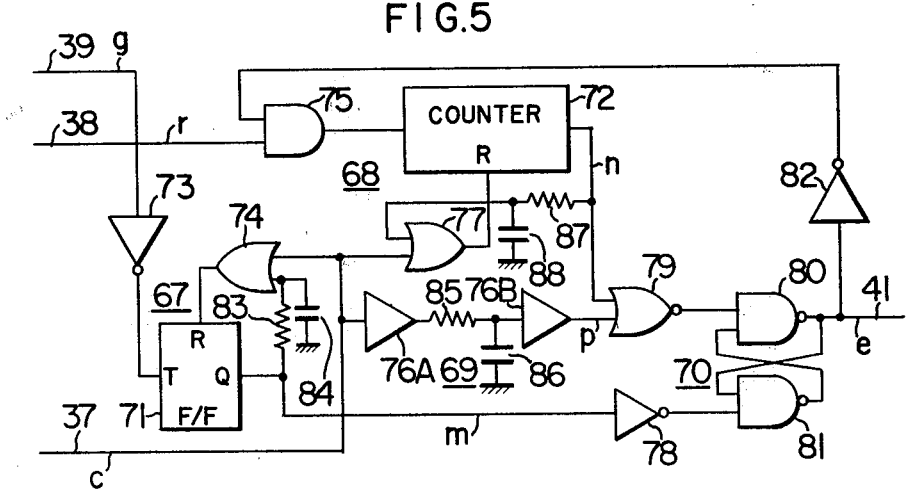
FIG. 5 is a diagram showing the timer circuit of FIG. 1.

Next, the timer circuit 5 will be described with reference to FIGS. 5 and 6. The timer circuit 5 is made up of a differentiator circuit 67, a counter circuit 68, a delay circuit 69 and an output circuit 70. The differentiator circuit 67 includes an inverter 73, a T-F/F 71, an OR gate 74, a resistor 83 and a capacitor 84; the counter circuit 68 includes a counter 72, an AND gate 75, an OR gate 77, a resistor 87, a capacitor 88 and an inverter 82; the delay circuit includes buffers 76A and 76B, a resistor 85A and a capacitor 86; and the output circuit 70 includes a NOR gate 79, NAND gates 80 and 81, and an inverter 78. The NAND gates 80 and 81 make up a set-reset flip-flop (hereinafter referred to as S-R-F/F).

The initial pulse (c) of FIG. 4 supplied from the main control circuit 3 to the timer circuit 5 through the line 37 is applied to the OR gate 74, the OR gate 77 and the buffer 76A. The initial pulse (c) of FIG. 4 is shown in (c) of FIG. 6. The initial pulse (c) of FIG. 6 causes the output signals of the OR gates 74 and 77 to be increased to level H, so that the T-F/F 71 and the counter 72 are reset, while the output signals of T-F/F 71 and the counter 72 are reduced to level L. The output signal of T-F/F 71 is applied to the NAND gate 81 through the inverter 78. The voltage waveform of the output signal of T-F/F 71 is shown in (m) of FIG. 6. The output signal of the counter 72 is applied through the NOR gate 79 and the resistor 87 to the OR gate 77. The voltage waveform of the output signal of the counter 72 is shown in (n) of FIG. 6. The initial pulse (c) of FIG. 6 applied to the buffer 76A is delayed by the resistor 85 and the capacitor 86 by $\Delta t_1$ and, through the buffer 76B, applied to the NOR gate 79. The voltage waveform of the output signal of the buffer 76B is shown in (p) of FIG. 6. The output signal of the NOR gate 79 is applied to the NAND gate 80. At time point $t_1 + \Delta t_1$, the signal applied from the inverter 78 to the NAND gate 81 assumes level H, and therefore S-R-F/F 70 is set, so that the output signal of the NAND gate 80 is raised to level H. The voltage waveform of the output signal of the NAND gate 80 is shown in (e) of FIG. 6. As shown in FIG. 1, the output signal of the NAND gate 80 (hereinafter referred to as the timer signal) is applied through the line 41 to the AND gate 6 and the OR gate 7. Additionally, it is applied through the inverter 82 to the AND gate 75.

Figure 6:
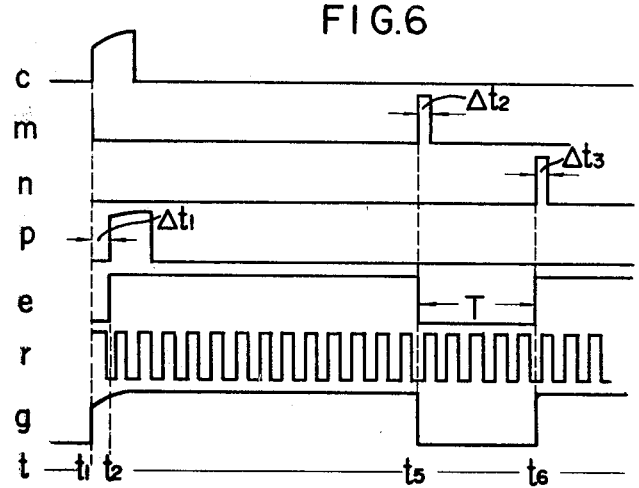
FIG. 6 is a diagram showing voltage waveforms generated at various parts of the timer circuit of FIG. 5.

Clock pulses as shown in (r) of FIG. 6 are applied to line 38 from the DC power supply circuit 2. This clock signal is produced from the voltage waveform of the AC power supply 1, and is applied to the counter 72 when the output signal of the inverter 82 is at level H. The output signal of AND gate 6 is applied to line 39 and further, through the inverter 73, to T-F/F 71. Only when the output signal of the AND gate 6 is at level L, T-F/F 71 is triggered and the output signal thereof is raised to level H. The voltage waveform produced in line 39 is shown in (g) of FIG. 6. When T-F/F 71 is triggered at time point $t_{15}$, the output signal of T-F/F 71 is raised to level H and, after being lowered to level L by the inverter 78, is applied to the NAND gate 81 thereby to reset S-R-F/F 70. The output signal of the T-F/F 71 is delayed by $\Delta t_2$ by the resistor 83 and the capacitor 84 and resets T-F/F 71 at time point $t_5 + \Delta t_2$, so that the output signal of T-F/F 71 is kept at level H during the period $\Delta t_2$. When the S-R-F/F 70 is reset, the timer signal (e) of FIG. 6 is reduced to level L. The timer signal (e) of FIG. 6 is applied through line 41 to the AND gate 6 and the OR gate 7.

When the timer signal (e) of FIG. 6 reaches level L, the output signal of the inverter 82 is raised to level H, with the result that the clock signal (r) of FIG. 6 is applied to the counter 72. The counter 72 counts the clock pulses (r) of FIG. 6 and when the count reaches a predetermined number, the output signal of level H is generated. The counter 72 performs the counting operation from time point $t_5$ to $t_6$. The length of this time is determined by the time required for equalization of refrigerant pressure. The output signal of counter 72 is delayed by $\Delta t_3$ by the resistor 87 and the capacitor 88 and, through the OR gate 77, again resets the counter 72. As a result, the output signal of the counter 72 is kept at level H during the length of time $\Delta t_3$. The output signal of the counter 72 is applied through the NOR gate 79 to the NAND gate 80 thereby to again set S-R-F/F 70.

Figure 7:
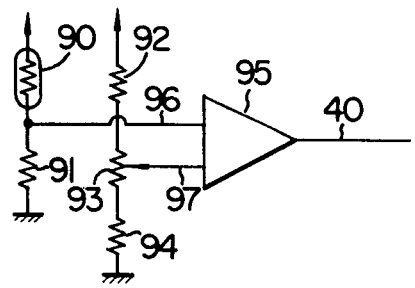
FIG. 7 is a diagram showing the temperature detector circuit shown in FIG. 1.

Next, the temperature detector circuit 4 will be explained with reference to FIG. 7. The circuit configuration of the temperature detector circuit 4 is well known. With the change in the temperature of air surrounding the temperature-sensitive element 90, the resistance value thereof undergoes a change, resulting in a change in the voltage at the junction point of the temperature-sensitive element 90 and the resistor 91. This voltage is applied to the comparator 95 by way of the line 96. The voltage of line 97 determined by the resistors 92 and 94 and the variable resistor 93 is properly regulated by the variable resistor 93 and then applied to the comparator 95. The comparator 95 compares the voltage in line 96 with that in line 97. In the event that the voltage of line 96 is not within the predetermined voltage range based on the voltage of line 97, the output signal of the comparator 95 is raised to level H. This output signal is applied via line 40 to the AND gate 6.

When the indoor air temperature enters the predetermined temperature range, the voltage of line 96 also enters the predetermined voltage range, so that the output signal of the comparator 95, i.e., the output signal of the temperature detector circuit 4 is reduced to level L.

Figure 8:
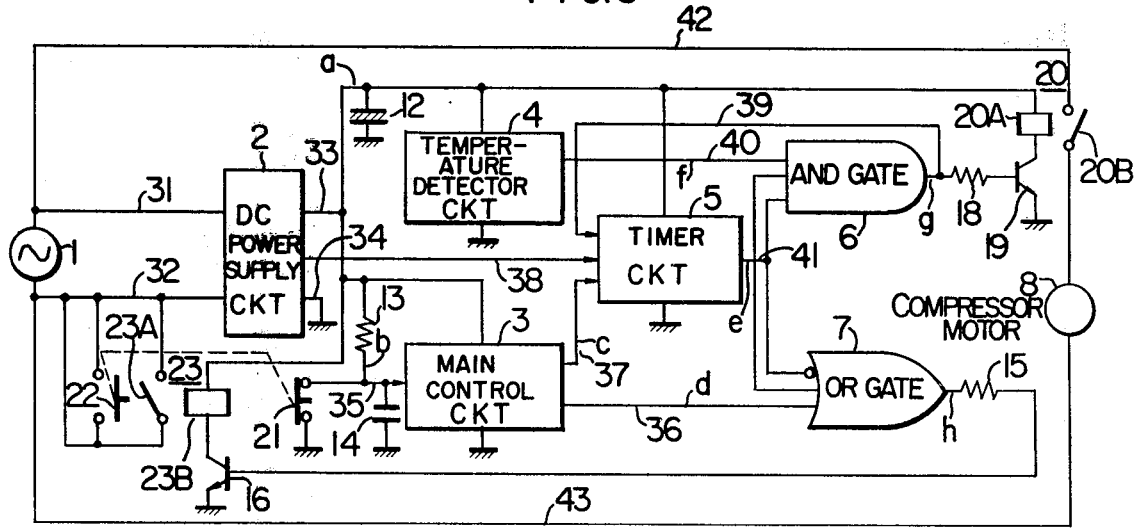
FIG. 8 is a circuit diagram showing in blocks another embodiment of the control apparatus according to the present invention.

Another embodiment of the present invention will be described with reference to FIG. 8. In this embodiment, the AC current supplied from the AC power supply 1 to the DC power supply circuit 2 is maintained by the output signal of the OR gate 7. The manual switches 21 and 22 are of non-lock type interlocked with each other. Normally, the contact of the switch 21 is closed and that of the switch 22 opened. When the contact of the switch 22 is closed, the contact of the switch 21 opens, so that the voltages (a) and (b) of FIG. 2 are generated in lines 33 and 35 as in the embodiment shown in FIG. 1. Further, at time point $t_4$, current flows to the transistor 16 from line 33 through the coil 23B of the relay 23, thereby closing the contact 23A of the relay 23. Since the contact 23A is connected in parallel to the switch 22, the current supplied to the DC power supply circuit from the AC power supply 1 is not cut off even when the contact of the switch 22 is opened. The circuits and operation thereof of the embodiment under consideration other than mentioned above are identical to those of the first embodiment. The contact 23A of the relay 23 opens the same way as in the first embodiment. In other words, the switch 21 is opened at time point $t_{16}$ (when the switch 22 is closed without affecting any other elements) and closed at time point $t_{17}$. After that, the contact 23A is opened at time point $t_{18}$, so that the AC current supplied to the DC power supply circuit 2 from the AC power supply 1 is cut off, with the result that the DC current supplied from lines 33 and 34 to each circuit is cut off.

It will be understood from the foregoing description that according to the present invention, once the compressor motor is stopped, the compressor motor is not started or restarted within a predetermined period of time and therefore the motor is not locked by the refrigerant pressure. Also, since the source current fails to be cut off until passage of the time required for equalization of refrigerant pressure, the compressor motor is not restarted before equalization of refrigerant pressure. Furthermore, as long as the refrigerant pressure is equalized, the compressor motor can be started immediately after supply of the source current.

We claim:

1. A control apparatus for controlling the operation of a compressor motor of an air conditioning unit, comprising a power supply circuit, a manual switch connected to said power supply circuit for turning on and off the current supplied from said power supply circuit to said control apparatus, a temperature detector circuit operated in response to the indoor air temperature, said temperature detector circuit generating a signal for prohibiting the start and restart of said compressor motor when the indoor air temperature is within a predetermined range, said temperature detector circuit generating a signal for permitting the start and restart of said compressor motor when the indoor air temperature is not within said predetermined range, a main control circuit for sequentially generating, in response to the voltage produced by the current supplied by said manual switch, a signal for permitting the operation of said compressor motor and a signal for prohibiting the operation of said compressor motor, said main control circuit further producing a single initial pulse, a timer circuit for generating, in response to selected one of the signals generated by said temperature detector circuit and said main control circuit for prohibiting the operation of said compressor motor, a signal for prohibiting the restart of said compressor motor until the passage of a predetermined length of time, said timer circuit further producing a signal permitting the restart of said compressor motor after the lapse of said predetermined length of time, said timer circuit being reset by the initial pulse produced by said main control circuit, a logic gate operated in response to the output signals produced by said temperature detector circuit, said main control circuit and said timer circuit for effecting selected one of prohibition and permission of the operation of said compressor motor, said logic gate producing a signal for supplying current to said compressor motor when all of said temperature detector circuit, said main control circuit and said timer circuit produce a signal permitting the operation of said compressor motor, said logic gate producing a signal for cutting off the current flow in said compressor motor when at least one of said temperature detector circuit, said main control circuit and said timer circuit produces a signal prohibiting the operation of said compressor motor, switch means for turning on and off the current flow in said compressor motor in response to the output signal of said logic gate, and an auxiliary control switch connected in parallel to said manual switch, said auxiliary control switch being turned on at least during the period of the presence of said signal prohibiting the restart of said compressor motor, in response to the signal generated by said timer circuit for prohibiting the restart of said compressor motor.

2. A control apparatus for controlling the operation of a compressor motor of an air conditioning unit, comprising a power supply circuit, a manual switch connected to said power supply circuit for turning on and off the current supplied from said power supply circuit to said control apparatus, a temperature detector circuit which is operated in response to the indoor air temperature, said temperature detector circuit generating a signal for prohibiting the start and restart of said compressor motor when the indoor air temperature is within a predetermined range, said temperature detector circuit generating a signal for permitting the start and restart of said compressor motor when the indoor air temperature is not within said predetermined range, a main control circuit for sequentially generating, in response to the voltage produced by the current supplied by said manual switch, a signal for permitting the operation of said compressor motor and a signal for prohibiting the operation of said compressor motor, a timer circuit for generating, in response to at least selected one of the signals generated by said temperature detector circuit and said main control circuit for prohibiting the operation of said compressor motor, a signal for prohibiting the restart of said compressor motor until the passage of a predetermined length of time, switch means operated in response to output signals of said temperature detector circuit, said main control circuit and said timer circuit, said switch means supplying current to said compressor motor when all of said temperature detector circuit, said main control circuit and said timer circuit produce a signal permitting the operation of said compressor motor, said switch means cutting off the current flow in said compressor motor when at least one of said temperature detector circuit, said main control circuit and said timer circuit produces an output signal prohibiting the operation of said compressor motor, and an auxiliary control switch connected in parallel to said manual switch, said auxiliary control switch being turned on at least during the period of the presence of the signal prohibiting the restart of said compressor motor, in response to the signal generated by said timer circuit for prohibiting the restart of said compressor motor.

3. A control apparatus for controlling the operation of a compressor motor of an air conditioning unit according to claim 2, in which said main control circuit includes means for generating a single pulse for resetting said timer circuit, in response to the voltage generated by the current supplied by said manual switch, and said timer circuit includes means reset by said pulse.

4. A control apparatus for controlling the operation of a compressor motor of an air conditioning unit according to claim 2, in which said auxiliary control switch includes a relay with a coil and a contact, said contact being closed when current flows in said coil, said contact being connected in parallel to said manual switch, said signal for prohibiting the restart of said compressor motor causing current to flow in said coil.

5. A control apparatus for controlling the operation of a compressor motor of an air conditioning unit according to claim 2, in which said means for cutting off the current flowing in said compressor motor includes a relay having a contact connected in series to said compressor motor, and means for opening said contact of said relay when at least one of said temperature detector circuit, said main control circuit and said timer circuit produces an output signal prohibiting the operation of said compressor motor.

6. A control apparatus for controlling the operation of a compressor motor of an air conditioning unit, comprising a DC power supply circuit for rectifying the AC current supplied to said control apparatus into a DC current, said DC power supply circuit supplying said DC current to each circuit of said control apparatus, a manual switch connected to said DC power supply circuit for turning on and off the AC current supplied to said DC power supply circuit, a temperature detector circuit operated in response to the indoor air temperature, said temperature detector circuit generating a signal for prohibiting the start and restart of said compressor motor when the indoor air temperature is within a predetermined range, said temperature detector circuit generating a signal for permitting the start and restart of said compressor motor when the indoor air temperature is not within said predetermined range, a main control circuit for sequentially generating, in response to the voltage produced by the current supplied by said manual switch, a signal for permitting the operation of said compressor motor and a signal for prohibiting the operation of said compressor motor, a timer circuit operated in response to the signal generated by selected one of said temperature detector circuit and said main control circuit for prohibiting the operation of said compressor motor, said timer circuit generating a signal for prohibiting the restart of said compressor motor before the lapse of a predetermined length of time after stoppage of said compressor motor, means operated in response to output signals of said temperature detector circuit, said main control circuit and said timer circuit, said means cutting off the current flow in said compressor motor when at least one of said temperature detector circuit, said main control circuit and said timer circuit produces an output signal prohibiting the operation of said compressor motor, and an auxiliary control switch turned on at least during the period of the presence of the signal prohibiting the restart of said compressor motor, in response to the signal generated by said timer circuit for prohibiting the restart of said compressor motor.

7. A control apparatus for controlling the operation of a compressor motor of an air conditioning unit according to claim 6, in which said main control circuit produces a single pulse for resetting the timer circuit, in response to the voltage generated by the current supplied by said manual switch.

8. A control apparatus for controlling the operation of a compressor motor of an air conditioning unit according to claim 6, in which said auxiliary control switch includes a relay with a coil and a contact, said contact being connected in parallel to said manual switch, said signal for prohibiting the restart of said compressor motor causing current to flow in said coil.

9. A control apparatus for controlling the operation of a compressor motor of an air conditioning unit according to claim 1, in which said means for cutting off the current flowing in said compressor motor includes a relay having a contact connected in series to said compressor motor, and means for opening said contact of said relay when at least one of said temperature detector circuit, said main control circuit and said timer circuit produces an output signal prohibiting the operation of said compressor motor.

* * * * *